(12) United States Patent
Kirschschlager et al.

(10) Patent No.: US 11,097,801 B2
(45) Date of Patent: *Aug. 24, 2021

(54) SCOOTER HAVING AN ELEMENT THAT CAN BE ATTACHED OR THAT IS CONNECTED IN AN ARTICULATED MANNER

(71) Applicant: SCOOT & RIDE GMBH, Grieskirchen (AT)

(72) Inventors: Robert Kirschschlager, Leonding (AT); Wolfgang Berndorfer, Natternbach (AT)

(73) Assignee: Scoot & Ride Holding GmbH, Grieskirchen (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,802

(22) Filed: May 8, 2020

(65) Prior Publication Data

US 2020/0298929 A1 Sep. 24, 2020

Related U.S. Application Data

(63) Continuation of application No. 15/759,553, filed as application No. PCT/AT2016/060056 on Sep. 13, 2016, now Pat. No. 10,723,405.

(30) Foreign Application Priority Data

Sep. 16, 2015 (AT) .................................. A 607/2015

(51) Int. Cl.
*B62K 3/00* (2006.01)
*A63C 17/28* (2006.01)
(Continued)

(52) U.S. Cl.
CPC .......... *B62K 15/006* (2013.01); *A63C 17/011* (2013.01); *A63C 17/265* (2013.01);
(Continued)

(58) Field of Classification Search
CPC .... B62K 3/002; B62K 15/006; B62K 15/008; B62K 21/00; B62K 21/16; B62K 9/00;
(Continued)

(56) References Cited

U.S. PATENT DOCUMENTS 1,410,373 A 3/1922 Choate
1,838,877 A 12/1931 Stevens
(Continued)

FOREIGN PATENT DOCUMENTS

AU 2001100614 2/2002
AU 2012200089 8/2012
(Continued)

OTHER PUBLICATIONS

International Search Report of PCT/AT2016/060056, dated Jan. 2, 2017.
(Continued)

*Primary Examiner* — Steve Clemmons
(74) *Attorney, Agent, or Firm* — Liang & Hennessey LLP; Brian Hennessey

(57) ABSTRACT

The invention relates to a scooter, comprising a standing surface, at least one rear wheel articulated to the standing surface, and at least one front wheel articulated to the standing surface, which scooter can be moved in a direction of travel, wherein the scooter also comprises an element that is connected in an articulated manner to or can be attached to the standing surface, which element can be transferred from a first position as a seat element to a second position as a holding bar for a person standing on the standing surface, wherein, in the case of use, the scooter can be
(Continued)

moved in the same movement direction in the case of a first position of the element and in the case of a second position of the element.

30 Claims, 21 Drawing Sheets

(51) Int. Cl.
  *B62K 15/00* (2006.01)
  *A63C 17/26* (2006.01)
  *A63C 17/01* (2006.01)
  *B62K 21/00* (2006.01)
(52) U.S. Cl.
  CPC .............. *A63C 17/28* (2013.01); *B62K 3/002* (2013.01); *B62K 15/008* (2013.01); *B62K 21/00* (2013.01)
(58) Field of Classification Search
  CPC ..... A63C 17/011; A63C 17/012; A63C 17/28; A63C 17/265; A63C 2203/06; A63C 2203/10
  See application file for complete search history.

(56) References Cited

U.S. PATENT DOCUMENTS

| | | | |
|---|---|---|---|
| 2,183,534 A | 12/1939 | Bernier | |
| 2,481,837 A | 9/1949 | Giese | |
| 4,941,670 A | 7/1990 | Parr | |
| 5,383,808 A | 1/1995 | DuBois | |
| 5,441,289 A | 8/1995 | Spielberger | |
| 6,089,586 A | 1/2000 | Rudell | |
| 6,286,843 B1 * | 9/2001 | Lin | A63C 17/0066 280/11.28 |
| 6,296,268 B1 | 10/2001 | Ford | |
| 6,588,787 B2 | 7/2003 | Ou | |
| 7,226,062 B1 * | 6/2007 | Stefano | A63C 17/014 280/87.041 |
| D631,102 S | 1/2011 | Jessie, Jr. | |
| 8,517,403 B2 * | 8/2013 | Jessie, Jr. | B62K 9/00 280/87.041 |
| 8,740,236 B2 * | 6/2014 | Ouboter | B62K 21/005 280/263 |
| 9,010,780 B1 | 4/2015 | Chiu | |
| 9,016,702 B2 | 4/2015 | Huang | |
| 9,033,351 B2 | 5/2015 | Sejnowski | |
| 9,233,728 B2 | 1/2016 | Mucaro | |
| 9,254,883 B2 | 2/2016 | Berndorfer | |
| 9,481,419 B2 * | 11/2016 | Bettin | B62K 15/006 |
| 9,809,272 B2 | 11/2017 | Mazoyer | |
| 2008/0179850 A1 | 7/2008 | Catelli | |
| 2009/0160150 A1 | 6/2009 | Johnson | |
| 2010/0148460 A1 | 6/2010 | Nelson | |
| 2015/0068828 A1 | 3/2015 | Delgatty | |
| 2015/0097346 A1 | 4/2015 | Mucaro | |

FOREIGN PATENT DOCUMENTS

| | | | |
|---|---|---|---|
| CN | 202201107 | 4/2012 | |
| CN | 104260808 | 1/2015 | |
| DE | 29612276 | 9/1996 | |
| DE | 202 14 201 | 2/2003 | |
| EP | 2476607 | 7/2012 | |
| FR | 2467003 | 4/1981 | |
| FR | 2818608 | 6/2002 | |
| FR | 3018260 | 3/2016 | |
| GB | 548348 | 10/1942 | |
| GB | 548348 A * | 10/1942 | ........... B62K 15/006 |
| WO | 0003773 | 1/2001 | |
| WO | 2011098887 | 8/2011 | |

OTHER PUBLICATIONS

International Preliminary Report on Patentability in PCT/AT2016/060056, dated Mar. 20, 2018.

* cited by examiner

SCOOTER HAVING AN ELEMENT THAT CAN BE ATTACHED OR THAT IS CONNECTED IN AN ARTICULATED MANNER

CROSS-REFERENCE TO RELATED APPLICATIONS

The present application is continuation of U.S. patent application Ser. No. 15/759,553, filed Mar. 13, 2018, entitled "SCOOTER HAVING AN ELEMENT THAT CAN BE ATTACHED OR THAT IS CONNECTED IN AN ARTICULATED MANNER", which is a national phase application of PCT Application No. PCT/AT2016/060056, filed Sep. 13, 2016, which claims the benefit of Austrian Patent Application No. A607/2015, filed Sep. 16, 2015, each of which is incorporated by reference in its entirety.

BACKGROUND OF THE INVENTION

1. Field of the Invention

The invention disclosed here relates to a scooter which comprises a standing surface, at least one rear wheel articulated to the standing surface and at least one front wheel articulated to the standing surface.

2. Description of the Related Art

According to the prior art persons using the scooter may stand and/or sit on the standing surface.

WO0003773 shows a scooter with a standing surface. A rear wheel and a steering device comprising a holding bar are connected to the standing surface. The steering device makes it possible to position the front wheels connected to the steering device. The user assumes a standing position on the standing surface and controls the scooter by means of the holding bar acting as an element. It is also possible for a person to sit on the standing surface and to control the scooter by means of the holding bar. WO0003773 does not disclose the use of the holding bar as a seat.

U.S. Pat. No. 4,941,670 discloses a scooter with a standing surface, wheels articulated onto said standing surface and a frame with handles connected to the standing surface, wherein the frame with handles can be used as a holding bar. A seat surface is also attached to the frame. U.S. Pat. No. 4,941,670 does not mention converting the frame with handles into a seat surface. The seat surface can be used independently of the use of the frame with handles.

FR2467003 describes a skateboard, onto which a holding bar and a seat are mounted as two separate elements. The seat cannot be moved from a position for use as a seat into a storage position.

EP2476607, in which document U.S. Pat. No. 4,941,670 and FR2467003 are named as the prior art, discloses securing a seat by means of a fastening element, in contrast to U.S. Pat. No. 4,941,670, such that the fastening element encases the holding bar. EP2476607 does not disclose converting the holding bar used as an element into a seat.

US2015/097346 discloses a scooter comprising an element articulated to the standing surface, which can be moved from a first position as a seat element into a second position as a holding element. However, for the scooter disclosed in US2015/097346 when using the element as a seat element, the direction of travel is in reverse to the direction of travel when using the element as a holding bar.

U.S. Pat. No. 6,296,568 discloses a scooter comprising a folding seat element, wherein the folded up seat element is not used as a holding bar, but as a covering element without any identifiable technical purpose for an additional holding bar.

FR3018260, DE29612276, US2015068828, FR281808, CN104260808, WO2011098887, DE20214201, CN202201107 and US2010148460 do not mention the use of the seat element as a holding bar.

The scooters according to the prior art all have the disadvantage that the scooters are mainly designed only for a person in one position. The conversion of the scooters according to the prior art for use in another body position is limited and is also associated with problems.

Unused parts such as a seat are not convenient in the scooters according to the prior art. For example, the seat gets in the way of the person standing on the standing surface—unless it is removed.

In cases where it is possible to convert a scooter suitable for a person to use while standing to a scooter suitable for a seated person, this can only be achieved with considerable effort. For this purpose parts have to be removed which cannot be stowed on the scooter when not in use.

SUMMARY OF THE INVENTION

The invention disclosed here thus addresses the problem of reducing to a minimum the elements required for using the scooter when seated or standing and making it possible to use the remaining elements in both body positions or stow away the elements that are not needed.

According to the invention this is achieved in that the scooter also comprises an element which is articulated or attached to the standing surface via a joint and/or via an elastically and possibly plastically deformable coupling element, which element can be moved from a first position as seat element to a second position as a holding bar for a person standing on the standing surface, wherein the scooter can be moved in the same movement direction in a first position of the element and in a second position of the element when in use.

The person can move the element into the respective position prior to its use as a seat element (first position) or as a holding bar (second position).

The deformable coupling element can be designed for example as an elastically deformable coupling element in the form of a spring or a rubber element. The joint and/or the deformable coupling element, in particular an elastically deformable coupling element can be locked in the first position and/or in the second position and/or in a further position between the first position and the second position. A person skilled in the art would use locking devices for this such as for example locking devices, snap-on devices, snap-in locking devices or clamping devices according to the prior art. The joint can be designed as a locking joint for example.

Having the same movement directions in different positions of the element—in particular for scooters with a steering system—means that the driving characteristics are similar and they are easy to use. The driving characteristics are only changed slightly by changing the location of the joint center of gravity of the person and scooter in the different positions.

The element can be articulated or attached at different heights in the first position and/or in the second position.

The element can also be moved advantageously from the first position or the second position into a storage position.

In the storage position the element does not prevent the person from sitting or standing on the standing surface.

The element can be coupled within the scope of this invention directly or indirectly to the standing surface, i.e. by additional elements, which are mentioned or not mentioned in this disclosure, by a mechanical connection such as for example a joint or a plug connection.

The mechanical plug connection connecting the standing surface and the element can be designed so that in the first position or second position the mechanical connection formed by a joint or by a plug system between the element and the standing surface can be released so that the element can be moved by a free movement or a movement defined by the mechanical connection from one position to another position, so that the element in the other position is then connected mechanically to the standing surface.

The mechanical connection can thus only define the first position and the second position of the element. The invention disclosed here is not limited to the fact that the movement of the element from one position to the other position has to be predefined.

The joint, which can ensure the articulation of the element with the standing surface, can comprise a locking device, so that the element is locked in the first position or in the second position.

The element can be designed as an elongated element extending along a longitudinal axis of the element. The length of the element to be selected by a person skilled in the art has to be sufficiently long in the first position that a person can sit on the seat element. In the second, vertical position in its use as a holding bar the element is sufficiently long in order to be sufficiently tall that the person on the standing surface can comfortably grip the element as a holding bar.

The element can include a storage space.

The element can extend essentially horizontally in the first position and/or essentially vertically in the second position.

The scooter according to the invention can comprise a steering device, which is connected to the standing surface and on which steering device at least one front wheel and/or one rear wheel is articulated respectively. The activation of the steering device can be performed via the standing surface.

The steering device can comprise the element. The element is articulated or attached via the steering device on the standing surface, so that the element influences the steering device.

In its position as a holding bar the element is in an essentially vertical position. The person standing on the surface can hold onto the holding bar with their hands and activate the steering system by means of the holding bar and also by means of the standing surface. The person can accelerate the scooter with their feet.

In its position as a seat element however the element adopts an essentially horizontal position. The person can sit on the seat element and accelerate the scooter with their feet. The person can also be allowed—provided that the steering function is not locked—to activate the steering device via the seat element.

The movement of the element from a first position as a seat surface to a second position as a holding bar is essentially—without taking into account additional movements—a rotation of the element from a horizontal position to a vertical position. For this reason, the articulated element is mounted to be rotatable about an axis of rotation of the element.

The axis of rotation of the element can be at right angles to the longitudinal axis of the element. The element is rotated in the longitudinal direction of the scooter from one position to the second position.

The axis of rotation of the element can be the angle bisector between the first position and the second position. The element is rotated by a rotation from the longitudinal direction of the scooter from one position to the second position.

The element can be connected via the standing surface to the steering device.

A holding element can be attached onto the element and/or onto the standing surface so that the user has something else to hold on to. Preferably, the steering device comprises mounts for attaching the additional holding element in the first position and the element in the second position.

The additional holding element can extend through the element. The element can be designed here to be positive-locking for diverting the forces acting on the element into the element or via the standing surface into the element with the additional holding element.

The scooter according to the invention can comprise a weight-shifting steering system and/or a rotary steering system. The scooter can also comprise a friction brake, wherein a frictional surface is pressed against a wheel, preferably the rear wheel. The provision of a steering system on the scooter according to the invention assumes that the direction of travel is not changed—particularly with a weight-shifting steering system. The steering system would otherwise not be operable.

BRIEF DESCRIPTION OF THE DRAWINGS

The following description of the Figures is used to explain embodiments of the scooter according to the invention. The Figures and the descriptions of the Figures should not be considered to be restrictive. A person skilled in the art would be able to link features from the following description of the Figures with the general description above. A person skilled in the art is in particular able to replace the weight-shifting steering system mentioned by way of example in the Figures and in the description of the Figures with a rotary steering system.

In the Figures the following reference numerals identify the following elements of the scooter according to the invention. The person on the scooter is not shown in the Figures.

1 standing surface
2 rear wheel
3 front wheel
4 steering device
5 element
6 first position (of the element)
7 second position (of the element)
8 axis of rotation of the element
9 holding element
10 first element part
11 second element part
12 seat surface
13 joint surface
14 load
15 joint
16 panel
17 first panel mount 18 second panel mount
19 additional joints
20 movement direction

DETAILED DESCRIPTION

Figure 1:
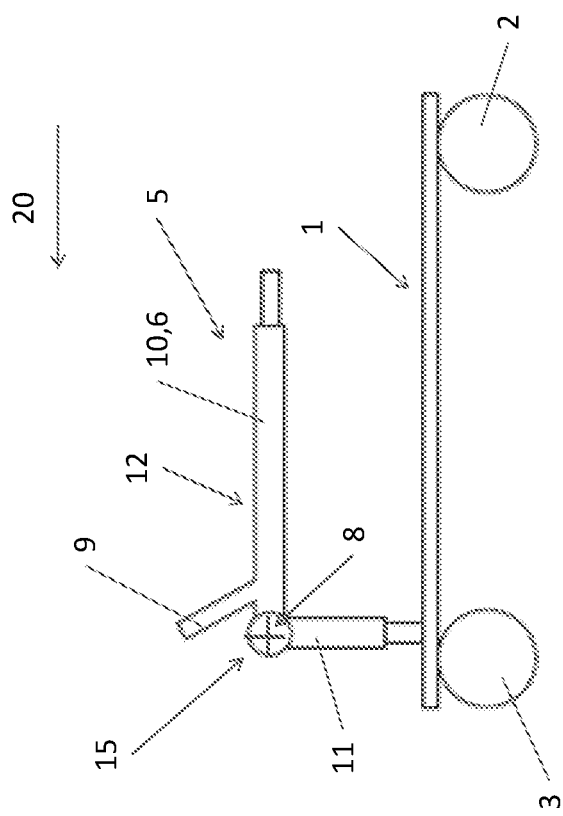
FIG. 1 to FIG. 21 show side views of embodiments of the scooter according to the invention, wherein the Figures with an uneven number show the element in a first position and the Figures with an even number show the element in a second position.
Figure 2:
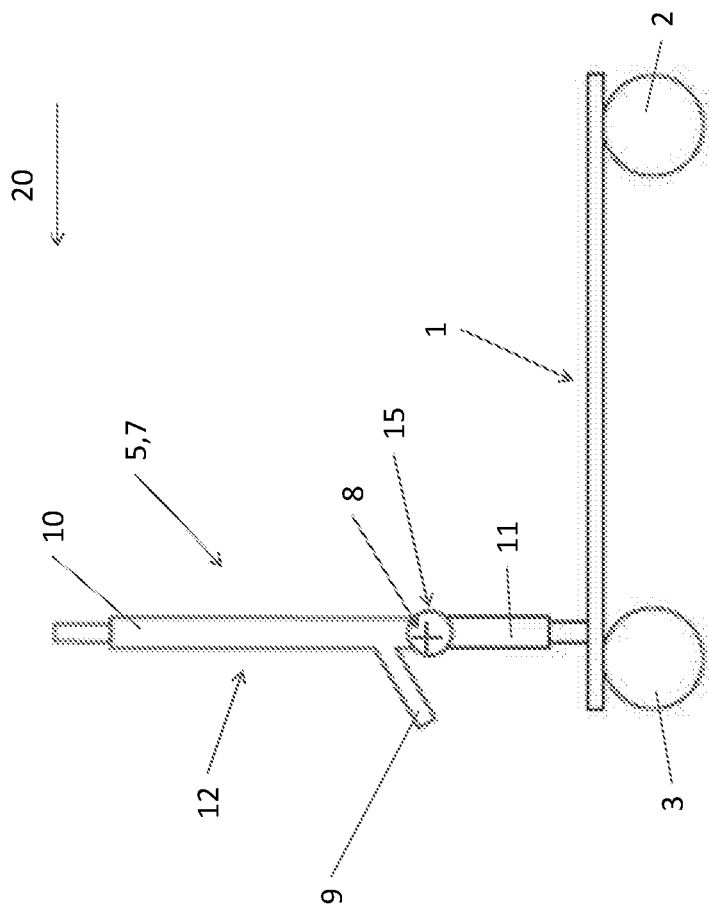

FIG. 1 and FIG. 2 show side views of a first embodiment of the scooter according to the invention without a steering device. The scooter of the first embodiment comprises a standing surface 1 for a person to adopt a standing position or a seated position. A rear wheel 2 and two front wheels 3 are articulated onto the standing surface 1. The scooter also comprises an element 5 attached to the standing surface 1, which can be moved from a first, essentially horizontal position 6 as a seat element (cf. FIG. 1) into a second, essentially vertical position 7 as a holding bar. For this the element 5 comprises a first element part 10 and a second element part 11, wherein the second element part 11 is connected rigidly at one end to the standing surface 1 and to the other end to the first element part 10 via a joint 15. The first element part 10 can be rotated relative to the second element part 11 about the axis of rotation of the element 8. The axis of rotation of the element 8 is at right angles to the plane of FIG. 1 and FIG. 2.

The first element part 10 comprises a seat surface 12, on which the person can sit. The seat surface only has one function in the first position 6. In the second position 7 the seat surface 12 does not have a function. The scooter also comprises a holding element 9, which the person sitting on the seat surface 12 can hold on to. The holding element 9 does not have any function in the second position 7.

The scooter shown in FIG. 1 and FIG. 2 does not comprise a steering device; the rear wheel 2 and the front wheels 3 are rotatable about their axes, but not mounted adjustably for steering the scooter.

Figure 3:
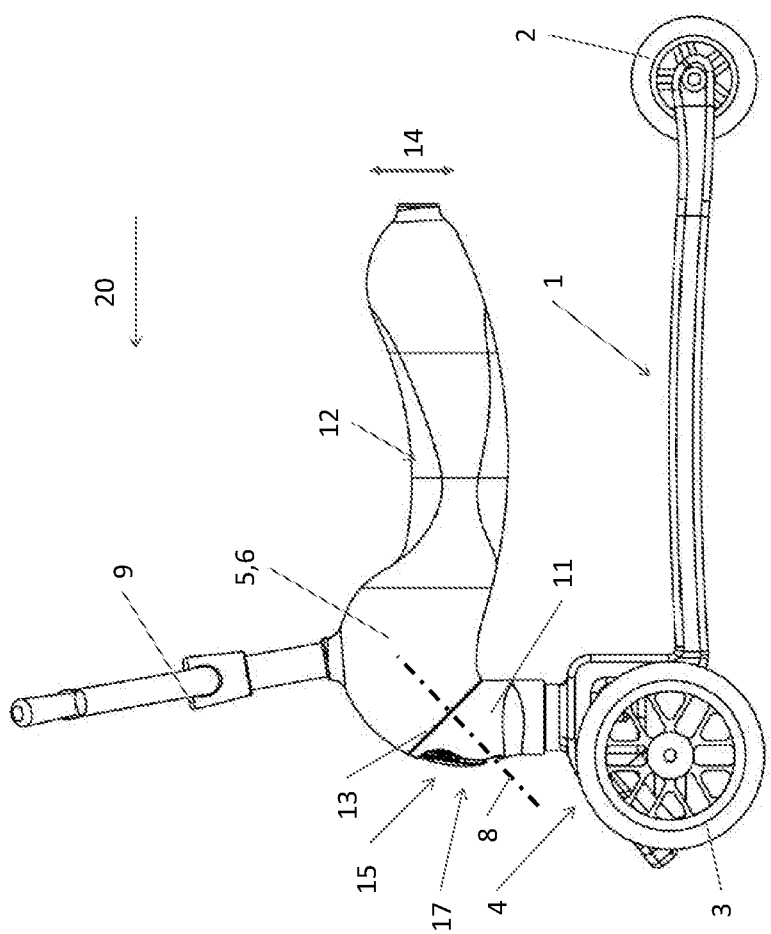
Figure 4:
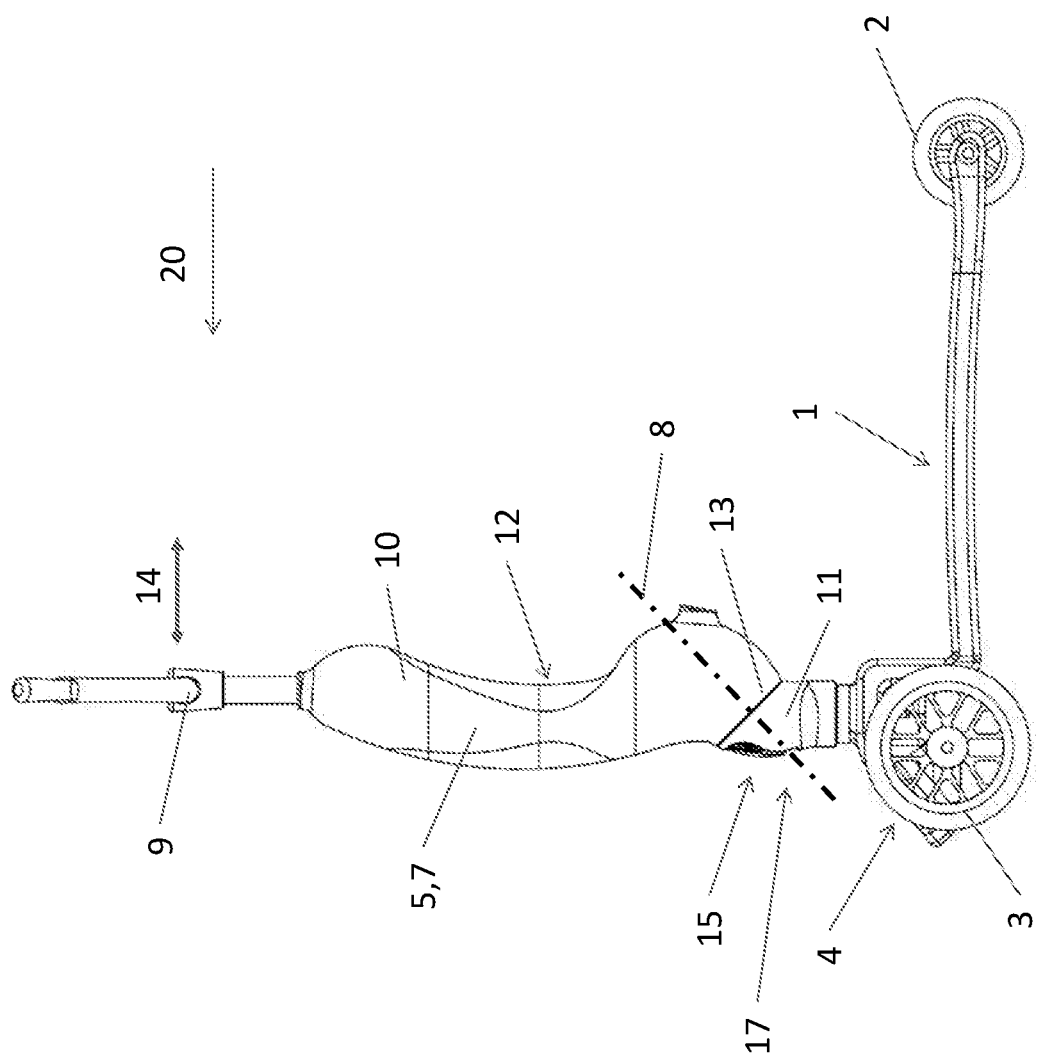

FIG. 3 and FIG. 4 show side views of a second embodiment of the scooter according to the invention, wherein FIG. 3 shows the scooter according to the invention comprising an element 5 in its first position as a seat element and FIG. 4 shows the scooter according to the invention comprising the element 5 in its second position as a holding bar.

The scooter shown in FIG. 3 and FIG. 4 comprises a standing surface 1 for a person to adopt a standing position, a rear wheel articulated onto the standing surface 1 and at least one front wheel 3 articulated via a steering device 4. In FIG. 3 and FIG. 4 the steering device 4 comprising a weight-shifting steering system is covered partly by the front wheel 3.

The scooter according to the invention also comprises an element 5 that can be attached to the steering device 4, which element 5 is shown in FIG. 3 in its first position 6 as a seat element. FIG. 4 shows the second position 7 of the element 5 as a holding bar. The first position 6 is essentially horizontal, whereas the second position 7 is essentially vertical.

The steering device 4 is connected to the standing surface 1 so that the element 5 can be attached to the standing surface 1 via the steering device.

The articulated element 5 comprises a first element part 10 and a second element part 11, wherein the first element part 10 is connected to the second element part 11 mounted rotatably by a joint 15 about an axis of rotation of the element 8. The first element part 10 can be swiveled from a first horizontal position 6 into a second vertical position 7. The second element part 11 is fixed essentially vertically in the steering device 4 with respect to movement and by means of its length or height in the first position 6 provides a comfortable seat height for a person. In the second position the first element part 10 and the second element part 11 together provide a comfortable holding height for the person standing on the standing surface 1. The first element part 10 and the second element part 11 are joined together by the joint 15.

The first element part 10 has a seat surface 12 which is designed to provide a comfortable seat for a person. The seat surface 12 only has this technical function in the first position 6; in the second position the seat surface 12 does not have any technical function.

The first element part 10 and the second element part 11 contact one another on a joint surface 13, which is entered as a line in FIG. 3 and FIG. 4. The joint surface 13 extends normally to the element axis 8. Thus for example loads 13 acting on the element 5 indicated for example in FIG. 3 and FIG. 4 can be absorbed better in the joint 15 by the person on the scooter.

The joint 15 comprises a locking device, so that it is possible to prevent the unwanted pivoting of the element 5 from one position to the other position.

The axis of rotation of the element 8 is an angle bisector between the first position 6 and the second position 7. The axis of rotation of the element 8 is inclined 45° to the horizontal and the vertical.

The scooter comprises a holding element 9, which is attached by mounts on the element 5 in the first position 6 and in the second position 7.

The additional holding element 9 in the first position 6 is used for the person sitting on the element 5 to hold on to. The additional holding element 9 is connected to be height-adjustable by the mount to the element 5, so that the sitting person can adjust the height of the additional holding element 9 to their requirements. The sitting person activates the steering device 4 operated by weight-shifting by shifting his weight in the seat on the seat surface 12 and/or by exerting force on one side (in FIG. 3 normal to the plane of the Figure).

In the second position the height for holding on to is provided by the element 5 and the additional holding element 9. Also here the additional holding element 9 is height-adjustable. The standing person activates the steering device operated by weight-shifting by shifting his weight on the standing surface 1 and/or by exerting a lateral force (in FIG. 4 normal to the plane of the Figure).

Figure 5:
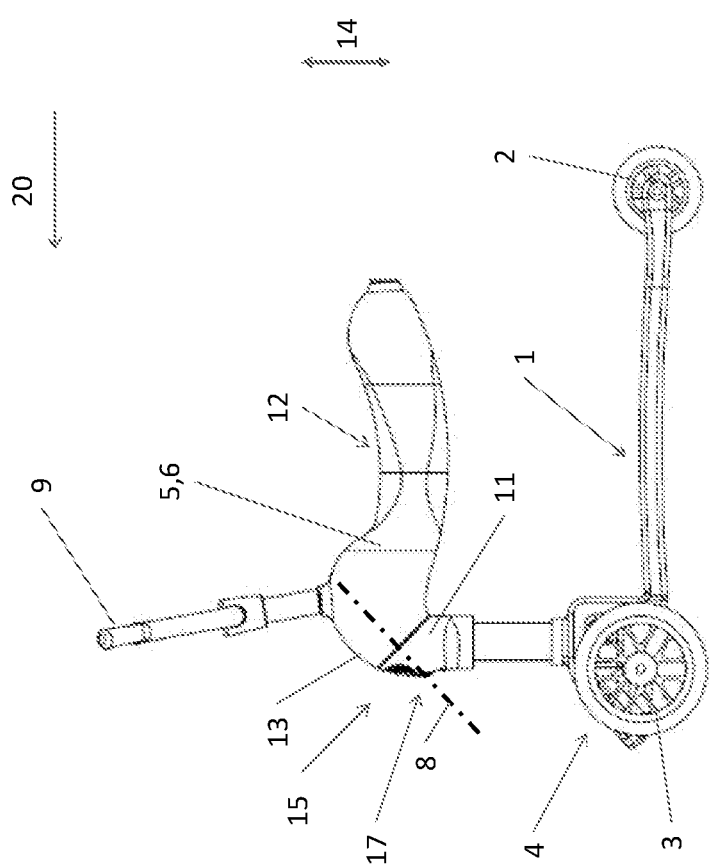
Figure 6:
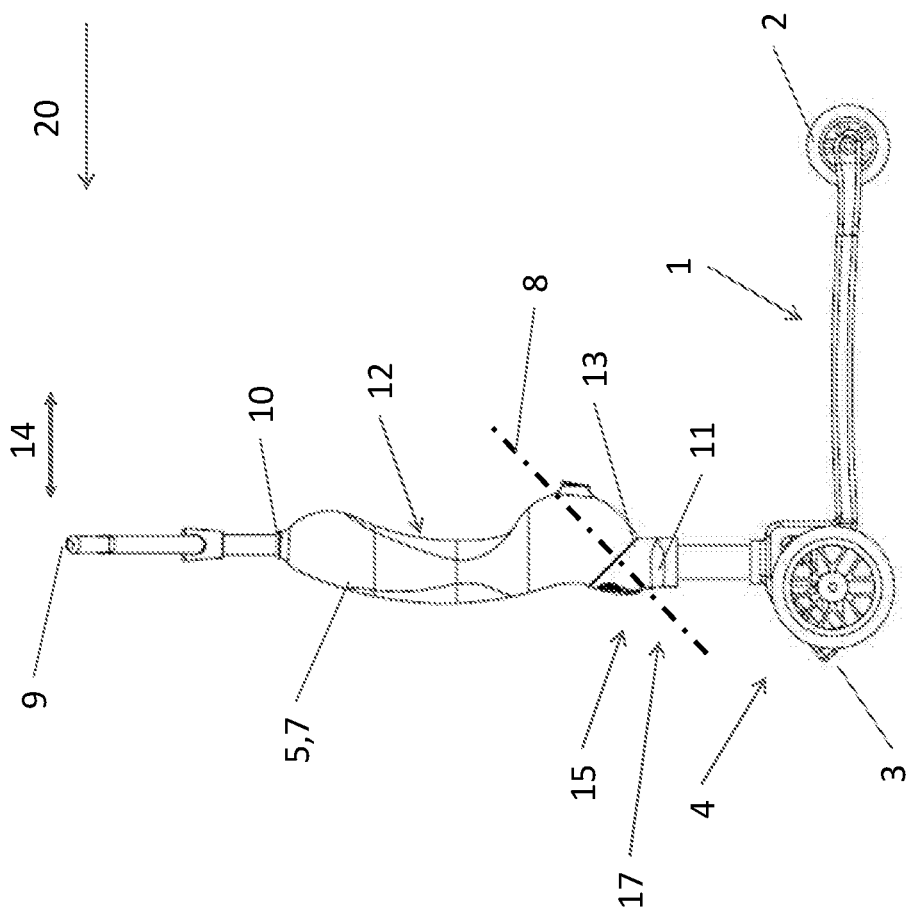

FIG. 5 and FIG. 6 illustrate the height adjustability of the element 5 on the scooter shown in FIG. 3 and FIG. 4. The element 5 comprises a first panel mount 17, by means of which the height of the element 5 can be selected relative to the standing surface 1 in the first position 6 (FIG. 5) and in the second position 7 (FIG. 6).

Figure 7:
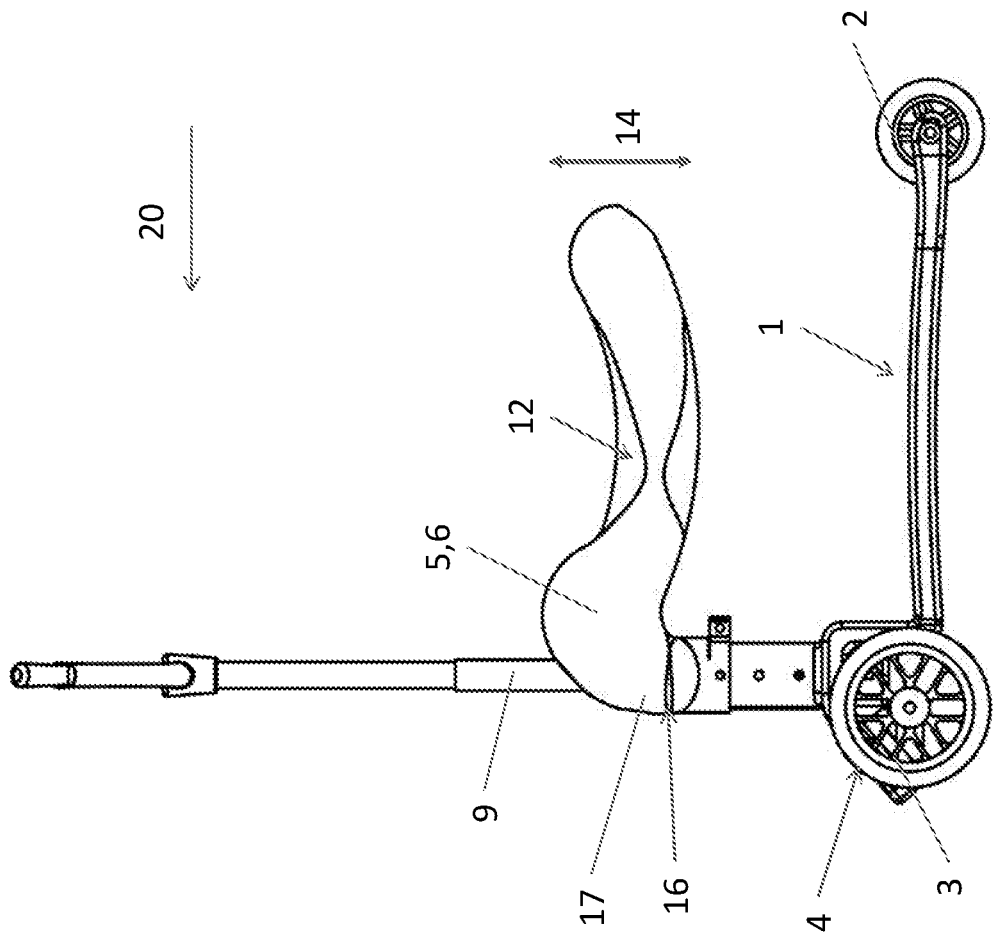
Figure 8:
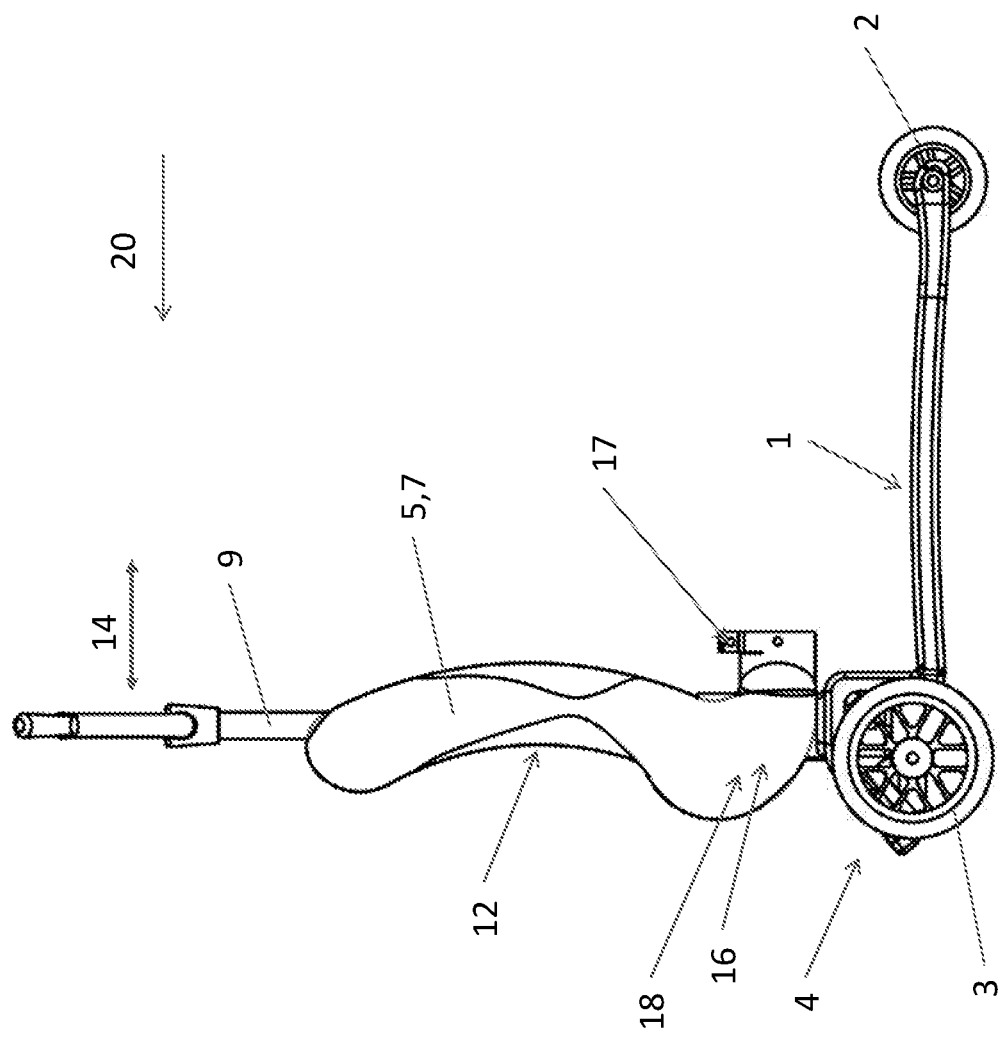

FIG. 7 and FIG. 8 show side views of a third embodiment of the scooter according to the invention. FIG. 7 shows the scooter comprising an element 5 in a first horizontal position 5 as a seat element; FIG. 8 shows the scooter comprising the element 5 in a second vertical position 6 as a holding element.

The scooter also comprises a standing surface 1 with an articulated rear wheel 2, a front wheel 3 articulated to a steering device 4, wherein the standing surface 1 and steering device 4 are connected mechanically. The steering device 4 operating as a weight-shifting steering system is in turn partly covered by the front wheel 3.

FIG. 7 also shows an element 5 attachable onto a panel 16, which is formed in one piece with the standing surface 1, in its first position 6 as a seat element. The element 5 comprises a first panel mount 17 fitting therewith, which is fitted onto the panel 16. The first panel mount 17 also comprises a clamping element for securing the element 5 onto the panel 16 in the first position 6, wherein the height position of the element 5 in the first position 6 can be adjusted by the clamping element. The element 5 extends horizontally and provides a sitting person with a comfortable seat surface 12.

FIG. 8 shows that the element 5 can also be attached in its second position 7 as a holding bar on the panel 16. For this the element 5 comprises a second panel mount 18, which allows the attachment of the element 5 onto the panel 16 in the second vertical position 7. The first panel mount 17 and the second panel mount 18 and the panel 16 have dimensions which would be determined by a person skilled in the art for absorbing the essential loads 18.

By attaching the element 5 in a first horizontal position 6 (cf. FIG. 7) and a second vertical position 7 (cf. FIG. 8) the element can be moved from a position of use as a seat element to a position of use as a holding bar.

FIG. 7 shows the second panel mount 18 and FIG. 8 shows the first panel mount 17 not in use. Likewise in the second position 7 the seat surface 12 is not in use.

The scooter shown in FIG. 7 and FIG. 8 comprises a holding element 9 which can be attached to the standing surface 1. The first panel mount 17 and the second panel mount 18 extend through the element 5, so that the additional holding element 9 can be pushed through the element 5 into the panel 16, and thus inserted. The first panel mount 17 and the second panel mount 18 extend through the element—not shown in FIG. 7 and FIG. 8.

The holding element 9 is used in the first position 6 for the person sitting on the element 5 to hold on to. The additional holding element 9 is connected height-adjustably by the mount to the element 5, so that the seated person can adjust the height of the additional holding element 9 to his requirements. The seated person activates the steering device 4 operated by weight-shifting by shifting his weight in the seat on the seat surface 12 and/or by exerting a lateral force (in FIG. 3 normal to the plane of the Figure).

In the second position the height for holding on to is provided by the element 5 and the holding element 9. Here too the additional holding element 9 is height-adjustable. The standing person activates the steering device operated by weight-shifting by shifting high weight on the standing surface 1 and/or by exerting a lateral force (in FIG. 4 normal to the plane of the Figure).

Figure 9:
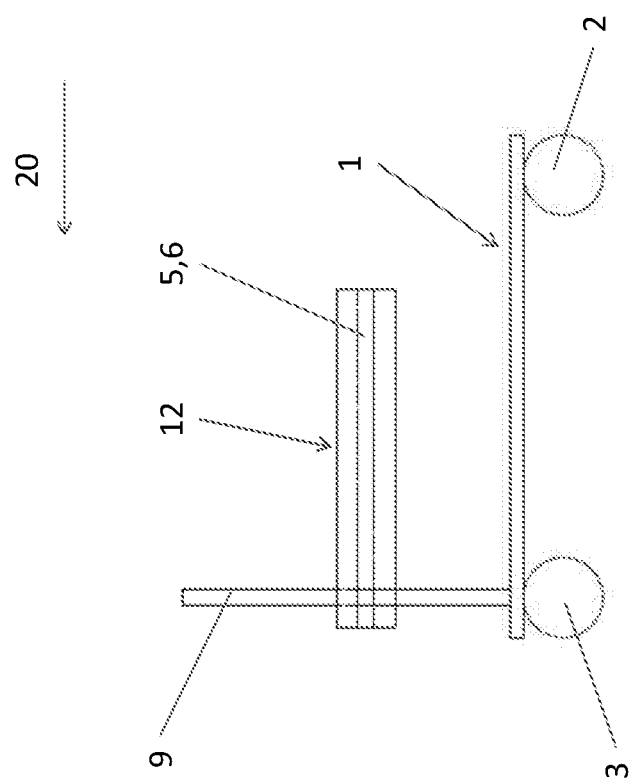
Figure 10:
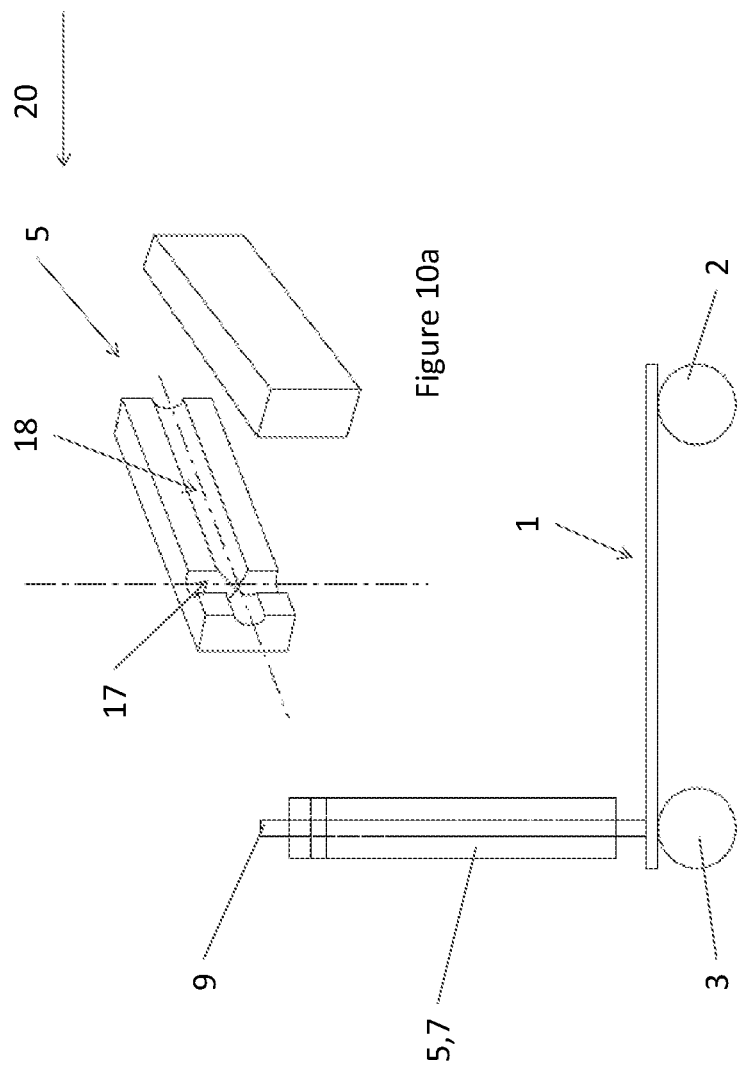

FIG. 9 and FIG. 10 show a side view of a scooter according to the prior art comprising a standing surface 1 for a person, a rear wheel 2 articulated to the standing surface 1 and two front wheels 3.

The scooter also comprises a holding element 9, which holding element 9 is connected to the standing surface 1.

The scooter according to the invention also comprises an element 5, which comprises a seat surface 12. The element 5 can be connected in a first, essentially horizontal position 6 (cf. FIG. 9) or in a second, essentially vertical position 7 (cf. FIG. 10) on the holding element 9 encasing the holding element 9.

FIG. 10a contained in FIG. 10 shows the element 5 in detail. The element 5 comprises two parts which are joined together for attaching the element 5 onto the holding element 9. One part of the element 5 comprises a first panel mount 17 and a second panel mount 18. The first panel mount 17 is used for mounting the holding element 9, so that the element 5 adopts the first position 6 (cf. FIG. 9). The second panel mount 18 is used for mounting the holding element 9 in the second position 7 (cf. FIG. 10).

Figure 11:
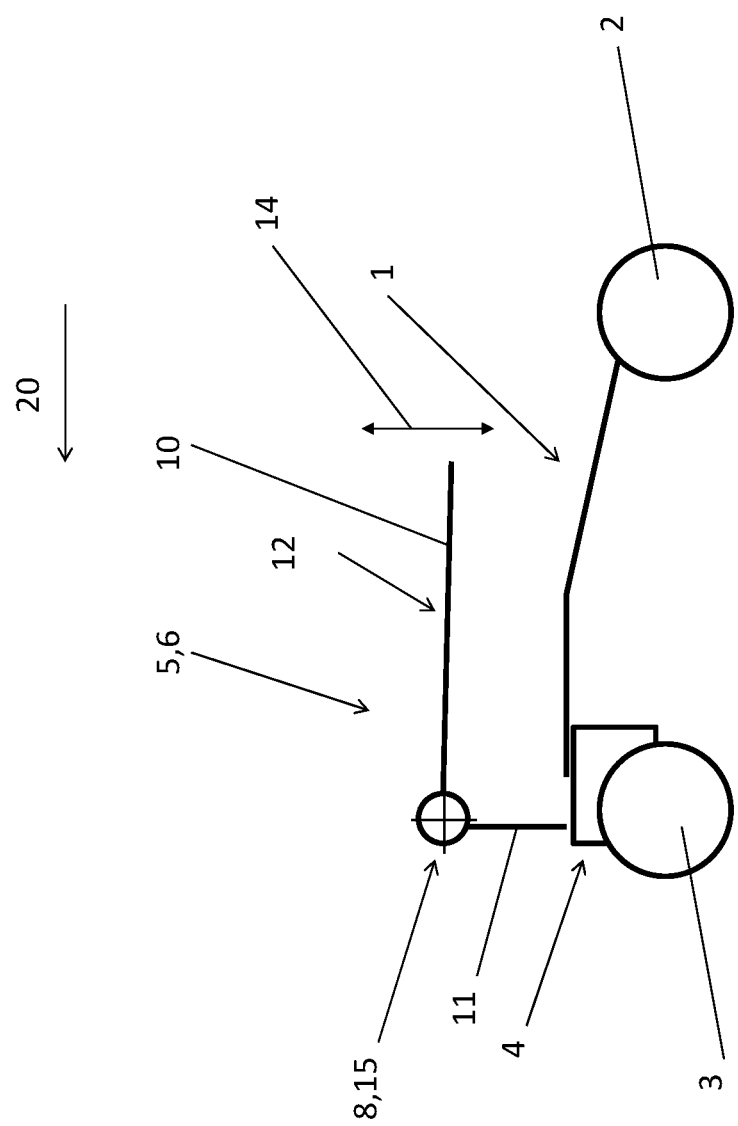
Figure 12:
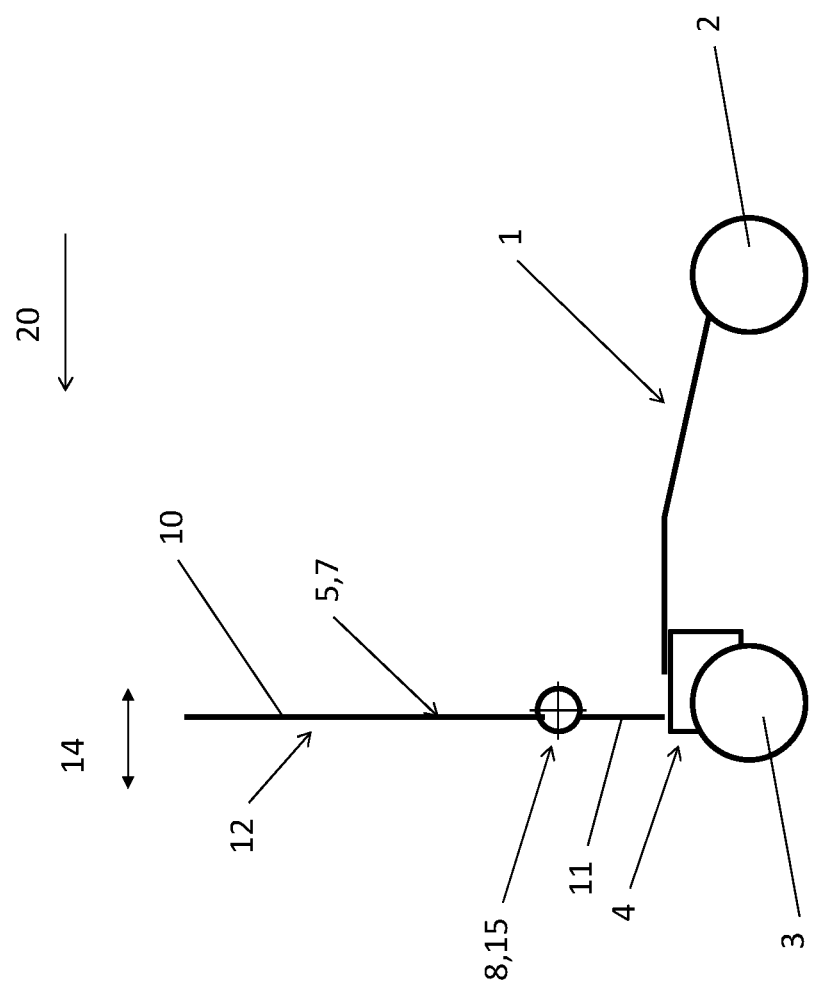

FIG. 11 and FIG. 12 show side views of a second embodiment of the scooter according to the invention, wherein FIG. 3 shows the scooter according to the invention comprising an element 5 in its first position as a seat element and FIG. 4 shows the scooter according to the invention comprising the element 5 in its second position as a holding bar.

The scooter shown in FIG. 11 and FIG. 12 comprises a standing surface 1 for a person to stand on, who is not shown, a rear wheel articulated to the standing surface 1 and at least one front wheel 3 articulated via a steering device 4. In FIG. 11 and FIG. 12 the steering device 4 comprising the weight-shifting steering system is covered partly by the front wheel 3.

The scooter according to the invention also comprises an element 5 attachable to the steering device 4, which element 5 is shown in FIG. 11 in its first position 6 as a seat element. FIG. 12 shows the second position 7 of the element 5 as a holding bar. The first position 6 is essentially horizontal, whereas the second position 7 is essentially vertical.

The steering device 4 is connected to the standing surface 1 so that the element 5 is connected to the standing surface 1 via the steering device.

The articulated element 5 comprises a first element part 10 and a second element part 11, wherein the first element part 10 is connected rotatably to the second element part 11 by a joint 15 about an axis of rotation of the element 8 oriented at right angles to the plane of FIG. 11 and FIG. 12. The first element part 10 can be swiveled from a first horizontal position 6 to a second vertical position 7. The second element part 11 is fixed essentially vertically and provides with its length or height in the first position 6 a comfortable seat height for a person. In the second position the first element part 10 and the second element part 11 together form a holding height which is comfortable for the person standing on the standing surface 1. The first element part 10 and the second element part 11 are connected together by the joint 15.

The first element part 10 comprises a seat surface 12 shaped to provide a comfortable seat for a person. The seat surface 12 only has this technical function in the first position 6; in the second position the seat surface 12 has no technical function.

The joint 15 comprises a locking device so that any unwanted pivoting of the element 5 from one position to another position can be prevented.

The scooter comprises a holding element 9, which is attached in the first position 6 and in the second position 7 by mounts on the element 5.

The additional holding element 9 is used in the first position 6 for the person sitting on the element to hold on to. The additional holding element 9 is connected height-adjustably via the mount to the element 5, so that a seated person can adjust the height of the additional holding element 9 as required. A seated person activates the steering device 4 operated by weight-shifting by shifting his weight when seated on the seat surface 12 and/or by exerting a lateral force (in FIG. 3 normal to the plane of the Figure).

In the second position the height for holding onto is formed by the element 5 and the additional holding element 9. Here too the additional holding element 9 is height-adjustable. The standing person activates the steering device operated by weight-shifting by shifting his weight on the standing surface 1 and/or by exerting lateral force (in FIG. 4 normal to the plane of the Figure).

Figure 13:
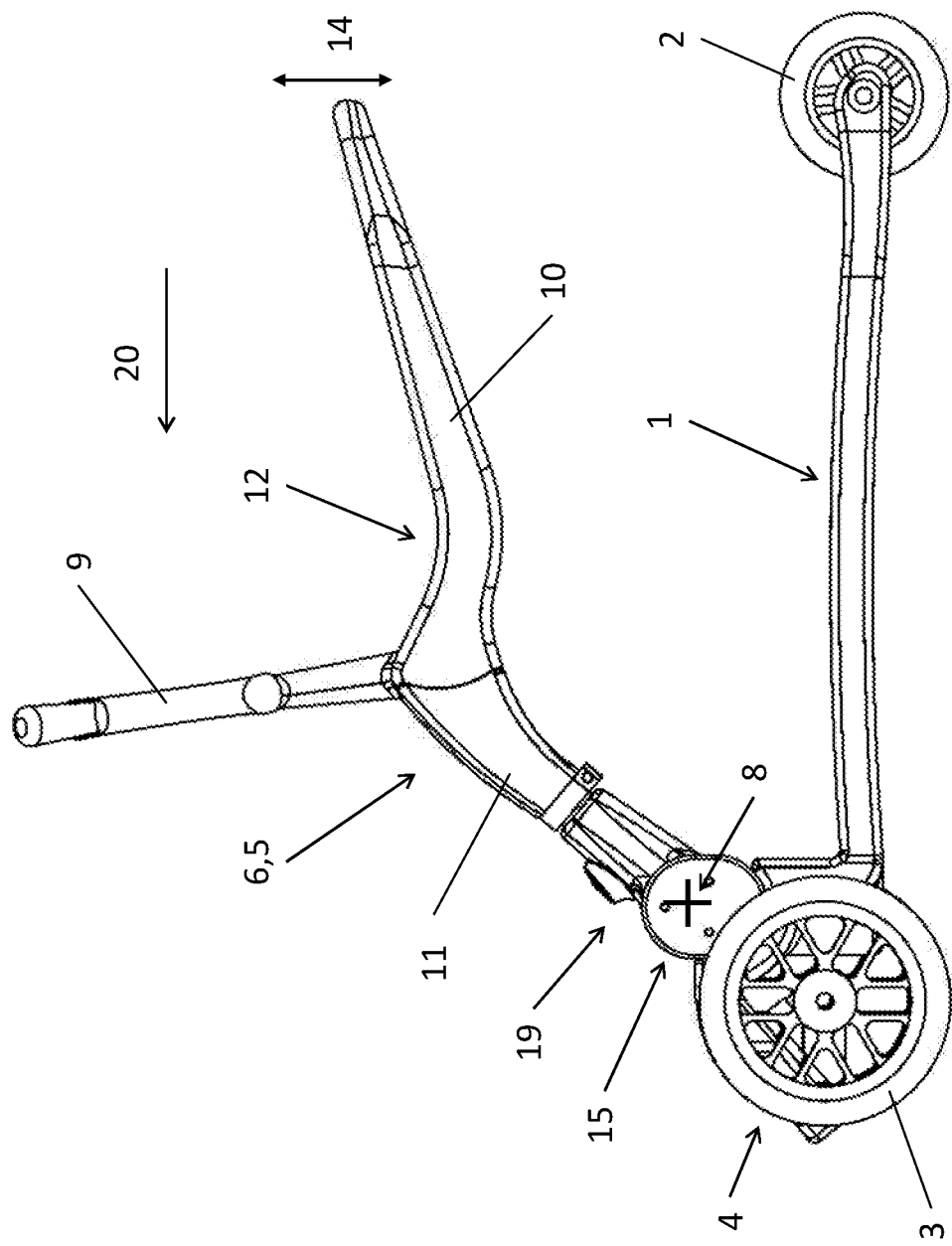
Figure 14:
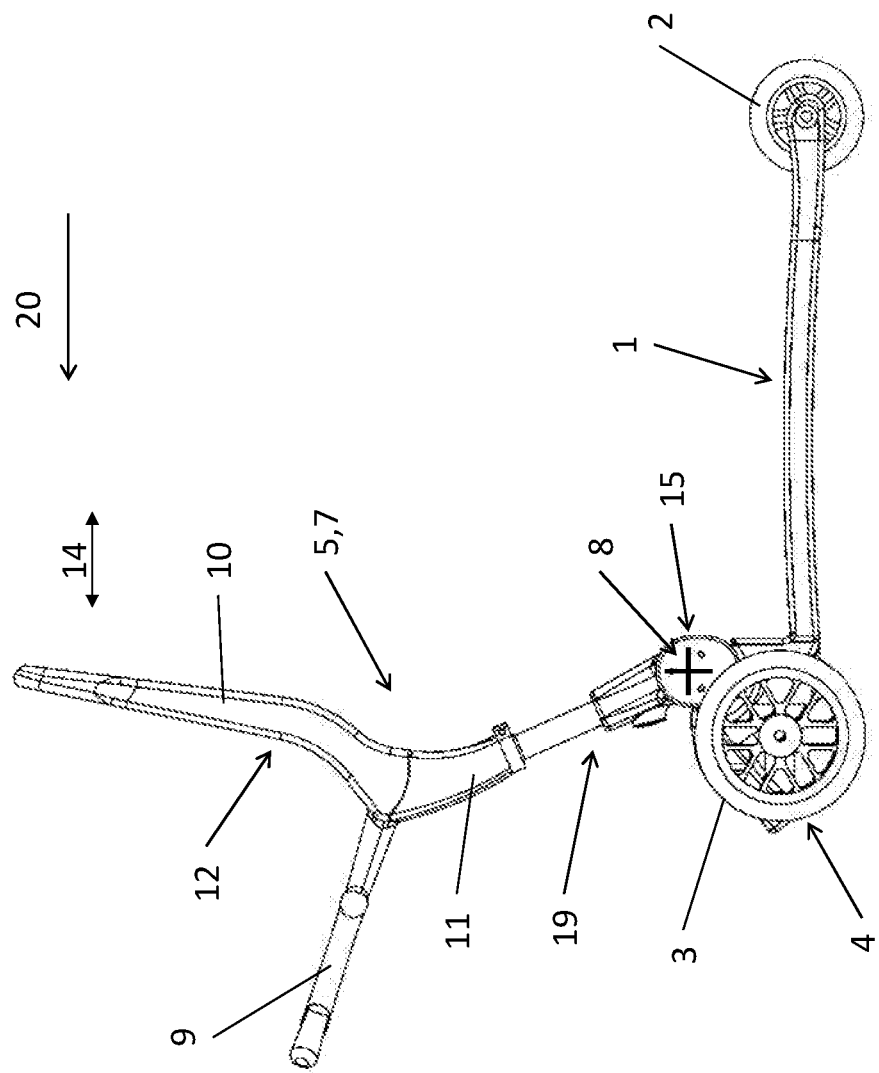

FIG. 13 and FIG. 14 show side views of a sixth embodiment of the scooter according to the invention which comprises a standing surface 1 for a person to adopt a standing position, which is not shown in FIG. 13 and FIG. 14, a rear wheel 2 articulated to the standing surface 1 and two front wheels 3 articulated to the standing surface 1 by means of a steering device 4.

The scooter also comprises an element 5 articulated to the standing surface 1 by means of a joint 15. The joint 15 hereby allows the rotation of the element 5 about a rotational axis of the rod 8, which rotational axis of the rod 8 is directed at right angles to the plane of the image of FIG. 13 and FIG. 14.

The element 5 comprises a first element part 10 and a second element part 11. The second element part 11 is connected at one end to the joint 15 and at its other end to the first element part 10, wherein there is a rigid connection between the first element part 10 and second element part 11. The first element part 10 and the second element part 11 have an angle of about 20° relative to one another.

FIG. 13 shows a first position 6 of the element 5, in which first position the first element part 10 is used as a seat. The first element part 10 comprises a seat surface 12, to provide the person with a comfortable seat. The joint 15 comprises a locking device to prevent the rotation of the element 5 so that the element 5 can support a seated person.

FIG. 14 shows a second position 7 of the element 5, into which second position 7 the element 5 can be moved after previously releasing the locking device. In its second position 7 the element 5 is used as a holding bar. The element 5 is essentially vertical in its second position 7, whereby the first element part 10 and the second element part 11 deviate slightly from the vertical due to the rigid, angled connection.

In the first position 6 the person sits on the first element part 10 and holds onto the holding element 9 attached to the element 5 with his hands. The person can accelerate the scooter with his feet, as the seated person can reach the ground with his feet. It is possible in this case to adjust the height of the seat by means of the joint 15 by the inclination of the element 5. For this, alternatively or in combination with the adjustment of the inclination, the seat height can be adjusted by the telescope 19, the second element part 11 being designed in this way. The person steers the scooter by shifting his weight on the seat surface 12 and by means of the holding element 9 which the person holds with his hands.

In the second position 7 the person stands on the standing surface 1 and holds onto the holding element 9 with his hands. The person can accelerate the scooter with his feet, as the person can reach the ground with his feet. The height of the holding element 9 can be adjusted by the joint 15 by inclining the element 5. For this, alternatively or in combination with the adjustment of the inclination, the height of the holding element 9 can be adjusted by the telescope 19, the second element part 11 being designed in this way. The person steers the scooter by shifting his weight on the standing surface 1 and by means of the holding element 9 which the person holds with his hands.

Figure 15:
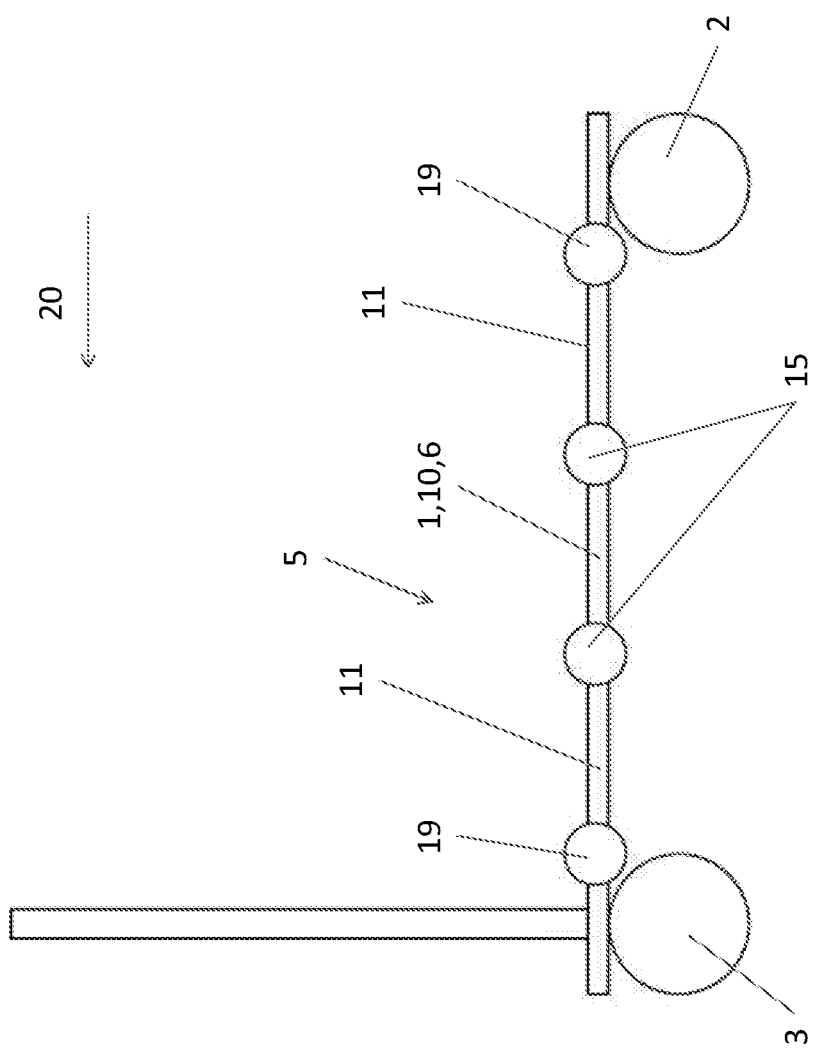
Figure 16:
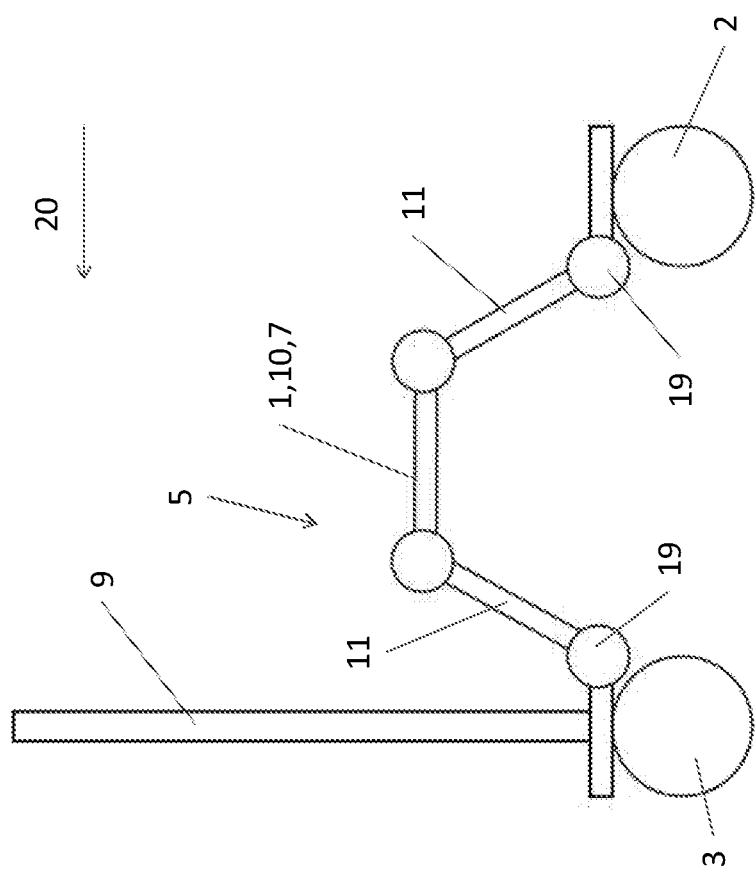

FIG. 15 and FIG. 16 show a schematic side view of one embodiment of a scooter comprising a standing surface 1, a rear wheel 2 articulated to the standing surface 1 and a front wheel 3 articulated to the standing surface 1.

The scooter has an element 5, which comprises one first element part 10 and two second element parts 11. The first element part 10 and the second element parts 11 are connected to one another rotatably by joints 15, so that the first element part 10 can be moved from a first position 6 as a seat (cf. FIG. 16) into a storage position (cf. FIG. 15). In the storage position the standing surface 1, the first element part 10 and the second element part 11 form a single plane. The person standing on the scooter can in principle stand on the whole plane.

The first element part 10 and the standing surface 1 may be formed in one piece.

A person skilled in the art would arrange the additional joints 19 so that the transfer of elements 5 from the storage position to the first position is geometrically possible.

The scooter also comprises a holding element 9, which the person standing on the standing surface 1 or sitting on the first element part 10 can hold on to.

Figure 17:
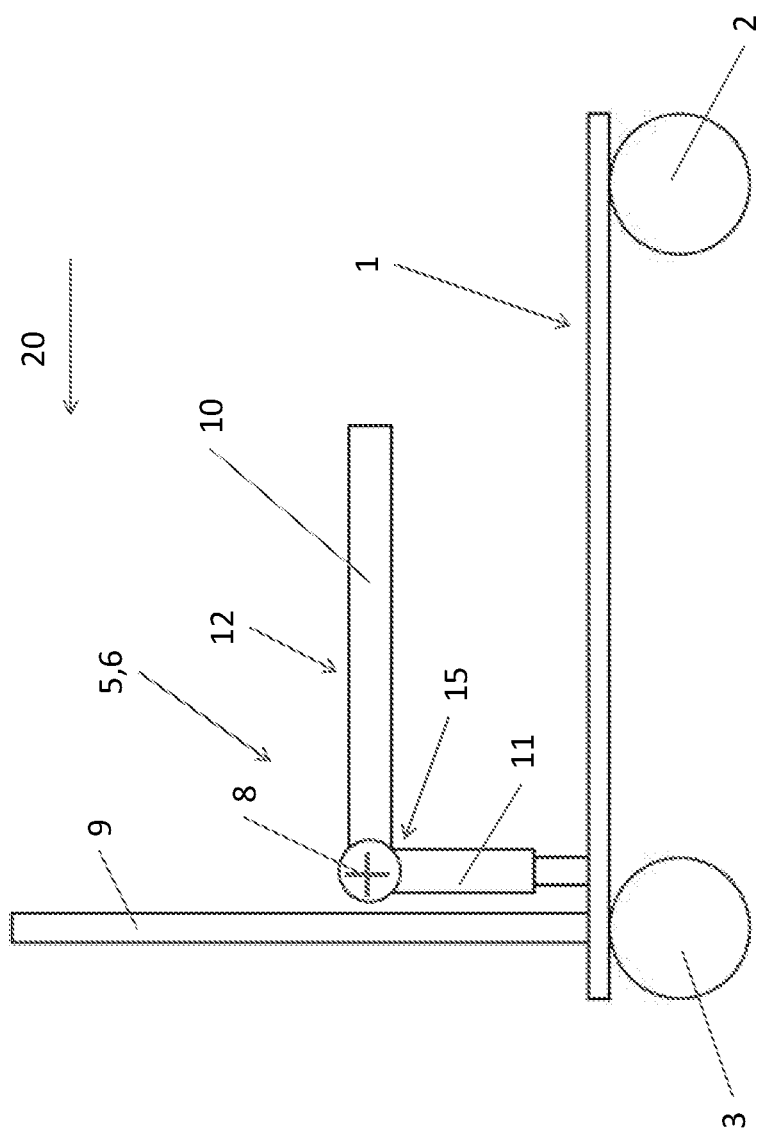
Figure 18:
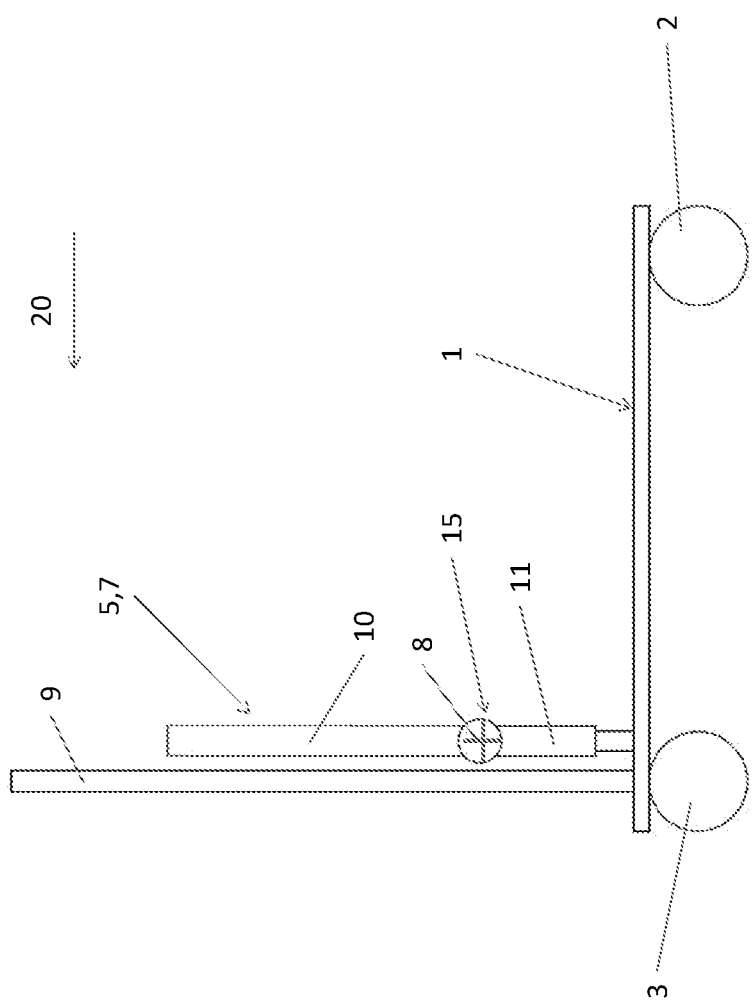

FIG. 17 and FIG. 18 show a schematic view of a scooter comprising a standing surface 1, a rear wheel 2 articulated to the standing surface 1 and a front wheel 3 articulated to the standing surface 1.

The scooter also comprises an element 5 attached to the standing surface 1, which element 5 comprises a first element part 10 and a second element part 11. The element parts 10, 11 are joined together by a joint 15, so that the first element part 10 can be adjusted relative to the second element part 11 by rotation about an element axis 8. Thus the element 5 can be moved from a first position 6 as a seat element (cf. FIG. 17) to a second position 7 as a holding bar (cf. FIG. 18). The first element part 10 comprises a seat surface 12, to make the seat comfortable for the person in the first position 6.

Figure 19:
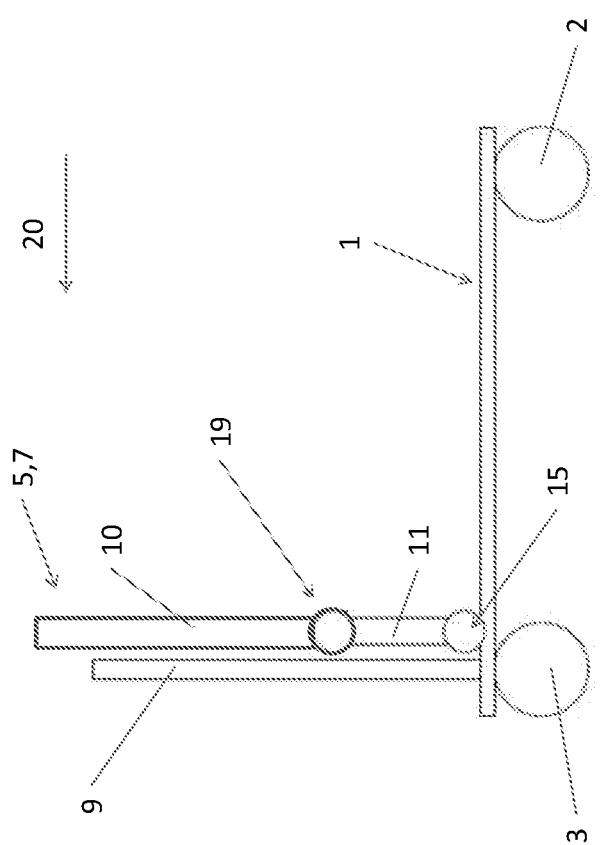
Figure 20:
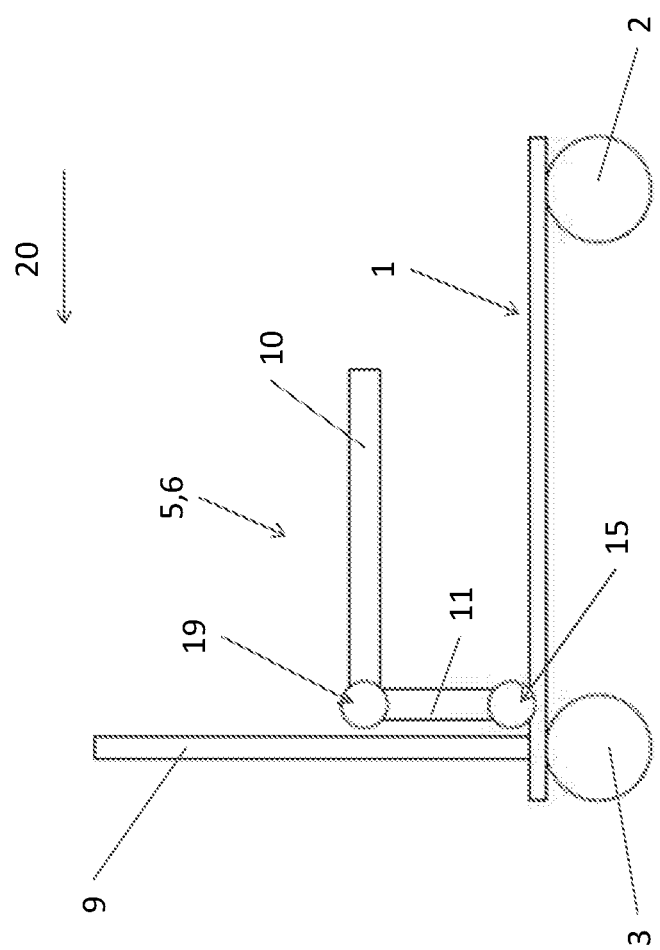
Figure 21:
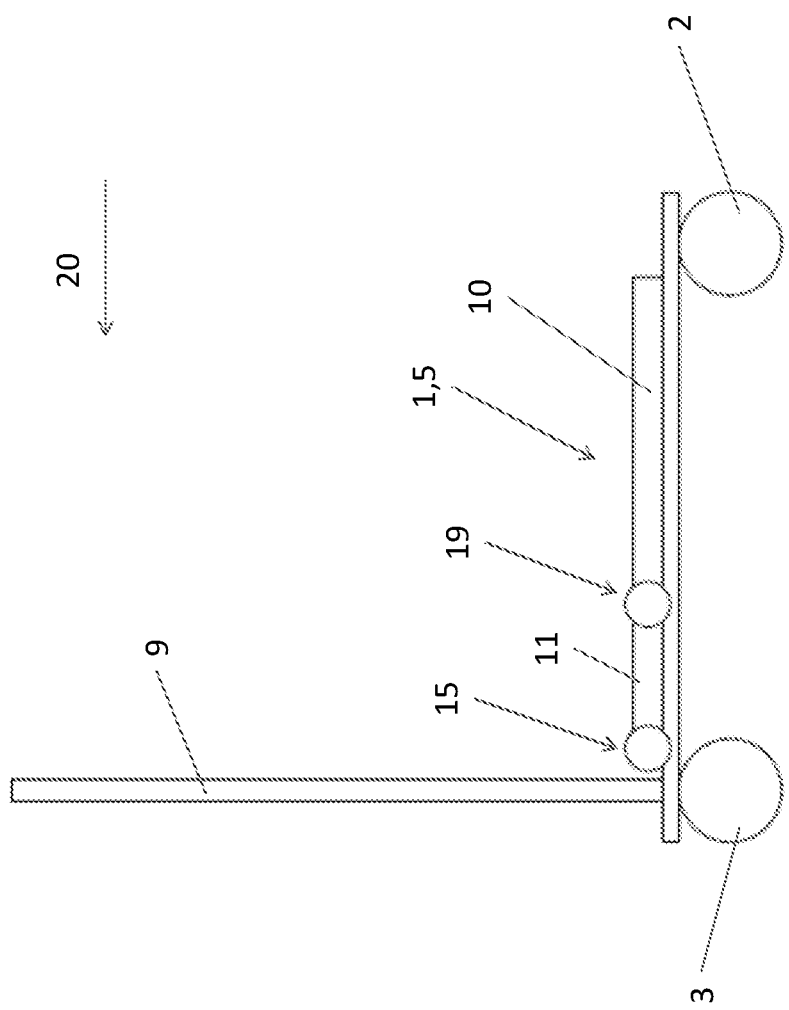

FIG. 19, FIG. 20 and FIG. 21 show side views of a scooter comprising a standing surface 1, at least one rear wheel 2 articulated to the standing surface 1 and at least one front wheel 3 articulated to the standing surface 1. Also an element 5 is articulated to the standing surface 1 via a joint 15, which element comprises a first element part 10 and a second element part 11. The element parts 10, 11 are connected by an additional joint 19. The element 5 can be moved between a first position 6 as a seat element comprising a seat surface 12 (cf. FIG. 20) and a second position 7 as a holding bar (cf. FIG. 19) and a storage position (cf. FIG. 21). In the storage position the element 5 has a form adapted to the standing surface 1, so that the person can adjust to the element 5 in the storage position.

The person sitting on the seat surface 12 or standing on the standing surface 1 can hold onto the additional holding element 9.

The invention claimed is:

1. A scooter comprising:
    a standing surface;
    at least one rear wheel attached to the standing surface and at least one front wheel attached to the standing surface;
    a sit-stand element movable from a first position as a seat element to a second position as a holding bar for a person standing on the standing surface, a first joint surface on the sit-stand element adapted to couple to a second joint surface attached to the standing surface when the sit-stand element is in the first and second positions, the first and second joint surfaces being inclined relative to a direction of travel when the first joint surface is coupled to the second joint surface;
    wherein the scooter is adapted to move in the direction of travel when the sit-stand element is in the first position and the second position;
    wherein the front wheel is steerable by a weight-shifting device and the weight-shifting device comprises the sit-stand element; and wherein the weight-shifting device is attached to the standing surface.

2. The scooter of claim 1, wherein the at least one front wheel is attached to the standing surface by the weight-shifting device.

3. The scooter of claim 1, wherein:
the sit-stand element is adapted to rotate about an axis between the first position and the second position; and
the axis is an angle bisector between the element in the first position and the element in the second position.

4. The scooter of claim 3, wherein the axis of rotation is inclined 45° to the horizontal and the vertical.

5. The scooter of claim 3, wherein a hinged joint comprises joint surfaces extending normally to the axis of rotation.

6. The scooter of claim 1, wherein:
the sit-stand element is adapted to rotate about an axis between the first position and the second position; and
the axis is in a plane defined by endpoints of the element in the first position and the second position.

7. The scooter of claim 1, further comprising a hinged joint, the sit-stand element being swiveled between the first and second positions via the hinged joint.

8. The scooter of claim 7, wherein the hinged joint can be locked in the first position or the second position.

9. The scooter of claim 1, further comprising an intermediate element arranged between the standing surface and the sit-stand element.

10. The scooter of claim 9, wherein the intermediate element is height adjustable with respect to the standing surface for adjusting a first height of the seat element when the sit-stand element is in the first position and a second height of the holding bar when the sit-stand element is in the second position.

11. The scooter of claim 9, wherein the second joint surface is attached to the standing surface by the intermediate element.

12. The scooter of claim 1, wherein the sit-stand element is height adjustable with respect to the standing surface.

13. The scooter of claim 1, wherein the first and second joint surfaces extend laterally to the direction of travel when the first joint surface is coupled to the second joint surface.

14. A scooter comprising:
a standing surface;
at least one rear wheel attached to the standing surface;
a weight-shifting steering device attached to the standing surface and adapted to steer the scooter;
at least one front wheel attached to the weight-shifting steering device; and
a sit-stand element attached to the standing surface and movable from a first position to a second position, the sit-stand element in the first position being a seat element, the sit-stand element in the second position being a holding bar for a person standing on the standing surface, a first joint surface on the sit-stand element adapted to couple to a second joint surface attached to the standing surface when the sit-stand element is in the first and second positions, the first and second joint surfaces being inclined relative to the standing surface.

15. The scooter of claim 14, wherein:
the sit-stand element is adapted to rotate about an axis between the first position and the second position; and
the axis is an angle bisector between the element in the first position and the element in the second position.

16. The scooter of claim 15, wherein the axis of rotation is inclined 45° to the horizontal and the vertical.

17. The scooter of claim 15, wherein a hinged joint comprises joint surfaces extending normally to the axis of rotation.

18. The scooter of claim 14, wherein:
the sit-stand element is adapted to rotate about an axis between the first position and the second position; and
the axis is in a plane defined by endpoints of the element in the first position and the second position.

19. The scooter of claim 14, further comprising a hinged joint, the sit-stand element being swiveled between the first and second positions via the hinged joint.

20. The scooter of claim 19, wherein the hinged joint can be locked in the first position or the second position.

21. The scooter of claim 14, further comprising an intermediate element arranged between the standing surface and the sit-stand-element.

22. The scooter of claim 21, wherein the intermediate element is height adjustable with respect to the standing surface for adjusting a first height of the seat element when the sit-stand element is in the first position and a second height of the holding bar when the sit-stand element is in the second position.

23. The scooter of claim 21, wherein the second joint surface is attached to the standing surface by the intermediate element.

24. The scooter of claim 14, wherein the sit-stand element is height adjustable with respect to the standing surface.

25. The scooter of claim 14, wherein the first and second joint surfaces extend laterally to a longitudinal axis of the standing surface when the first joint surface is coupled to the second joint surface.

26. A scooter comprising:
a standing surface;
at least one rear wheel attached to the standing surface;
a weight-shifting steering device attached to the standing surface and adapted to steer the scooter;
at least one front wheel attached to the weight-shifting steering device; and
a sit-stand element attached to the standing surface and movable from a horizontal position to a vertical position, the sit-stand element in the horizontal position being a seat element, the sit-stand element in the vertical position being a holding bar for a person standing on the standing surface, a first joint surface on the sit-stand element adapted to couple to a second joint surface attached to the standing surface when the sit-stand element is in the horizontal and vertical positions, the first and second joint surfaces being inclined relative to the sit-stand element in the horizontal position and the vertical position.

27. The scooter of claim 26, further comprising an intermediate element arranged between the standing surface and the sit-stand element.

28. The scooter of claim 27, wherein the intermediate element is height adjustable with respect to the standing surface for adjusting a first height of the seat element when the sit-stand element is in the horizontal position and a second height of the holding bar when the sit-stand element is in the vertical position.

29. The scooter of claim 27, wherein the second joint surface is attached to the standing surface by the intermediate element.

30. The scooter of claim 26, wherein the first and second joint surfaces extend laterally to a longitudinal axis of the sit-stand element in the horizontal position when the first joint surface is coupled to the second joint surface.

\* \* \* \* \*